US007269491B2

(12) United States Patent
Katrak et al.

(10) Patent No.: US 7,269,491 B2
(45) Date of Patent: Sep. 11, 2007

(54) CROSS-CHECKING PROCESSORS FOR POWERTRAIN CONTROL SYSTEMS USING A DEDICATED SERIAL DATA LINK

(75) Inventors: Kerfegar Khurshed Katrak, Fenton, MI (US); Paul Alan Bauerle, Fenton, MI (US); Bruce A. Rogers, Novi, MI (US); James L. Worthing, Munith, MI (US); Mark Henry Costin, Bloomfield Township, MI (US); Robert J. Schaller, Brighton, MI (US); James T. Purcell, Goleta, CA (US); Timothy John Hartrey, Brighton, MI (US); Patrick J. O'Leary, Clinton Township, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/147,658

(22) Filed: May 16, 2002

(65) Prior Publication Data

US 2003/0216848 A1 Nov. 20, 2003

(51) Int. Cl.
*G06F 7/00* (2006.01)

(52) U.S. Cl. ............................ 701/54; 701/29; 701/36

(58) Field of Classification Search .................. 701/29, 701/31-33, 36, 51-54, 34; 477/107, 34, 477/90, 110, 115

See application file for complete search history.

(56) References Cited

U.S. PATENT DOCUMENTS

| | | | | |
|---|---|---|---|---|
| 4,982,620 | A * | 1/1991 | Holbrook et al. | 74/731.1 |
| 5,983,740 | A * | 11/1999 | Salecker et al. | 74/336 R |
| 6,231,477 | B1 * | 5/2001 | Hollingsworth et al. | 477/107 |
| 6,263,269 | B1 * | 7/2001 | Dannenberg | 701/29 |
| 6,434,466 | B1 * | 8/2002 | Robichaux et al. | 701/54 |
| 6,526,340 | B1 * | 2/2003 | Reul et al. | 701/29 |
| 2002/0007979 | A1 | 1/2002 | Wilson | 180/292 |

FOREIGN PATENT DOCUMENTS

| | | |
|---|---|---|
| DE | 4441896 | 5/1996 |
| DE | 69523509 | 10/2001 |
| DE | 4112334 | 2/2003 |

OTHER PUBLICATIONS

Robert Bosch Gmbh: Schnittstellen zu anderen Systemen [nterfaces to other systems], in: Motormanage Motronice, Technische Unterrichtung, Stuttgart, 1998, p. 64-65.

* cited by examiner

*Primary Examiner*—Y. Beaulieu

(57) ABSTRACT

An engine management system for a vehicle includes engine and transmission control modules that are connected to a serial vehicle data bus. A dedicated serial data bus is connected to the transmission control module and the engine control module. The engine and the transmission control modules perform processor validity and integrity checks over the dedicated data bus. In an alternate powertrain management system, engine and transmission control modules are connected to a serial vehicle data bus.

11 Claims, 2 Drawing Sheets

CROSS-CHECKING PROCESSORS FOR POWERTRAIN CONTROL SYSTEMS USING A DEDICATED SERIAL DATA LINK

TECHNICAL FIELD

The present invention relates to electronic control systems for vehicles, and more particularly to powertrain control systems for vehicles.

BACKGROUND OF THE INVENTION

Drivers control the speed of a vehicle such as a truck or automobile by modulating an accelerator pedal. Mechanical linkages and valves control the flow of air and fuel to the engine based on the position of the accelerator pedal. When the driver depresses the accelerator pedal, the flow of air and fuel to the cylinders varies to increase engine speed.

Electronic throttle control (ETC) systems replace the mechanical accelerator pedal assemblies that are currently used in vehicles. ETC systems include one or more accelerator pedal position sensors, an ETC control algorithm and a controller such as the engine and/or powertrain controllers. ETC systems enhance powertrain management while reducing the manufacturing costs that are associated with mechanical pedal systems. ETC sensors eliminate the mechanical linkages and valves that are used to connect the accelerator pedal to the throttle body. ETC sensors sense the position of the accelerator pedal and send electronic signals to the controller. The controller uses the throttle control signal as one basis (among others) for controlling various aspects of the powertrain such as adjusting the air/fuel flow to the engine, shifting of the transmission, etc. In vehicles with ETC systems, the driver indirectly controls the engine and powertrain through the controller.

ETC systems can also coordinate the engine speed with the shifting of the transmission. Direct mechanical systems often shift under high-load conditions, which may decrease the life of the transmission. In ETC systems, the powertrain controller decreases the throttle, shifts, and then increases the throttle. This shifting approach can increase the life of the transmission.

ETC has other benefits as well. Because the driver no longer directly controls the throttle, the powertrain controller can reduce emissions and increase fuel efficiency. Furthermore, the throttle settings can be modified electronically to provide cruise and traction control functions.

Vehicles incorporating ETC systems are designed to prevent malfunctions. To that end, these vehicles usually provide redundancy and perform periodic onboard diagnostic checks. Some vehicles control powertrain torque via one or more algorithms that check powertrain safety critical torque. The algorithms are executed by an engine control module that typically includes a main processor and a motor control processor. For vehicles that do not include a transmission control module, a power control module typically includes the main processor and the motor control processor.

The main and motor control processors redundantly calculate the ETC security algorithms and check the powertrain safety critical torque for validity. In future applications, the ETC algorithms may not be responsible for powertrain torque control. Examples where ETC algorithms are not responsible for powertrain torque control include coordinated torque control, continuously variable transmissions and other powertrain torque modifiers. In these systems, it is essential to develop a powertrain architecture and control algorithms that will validate powertrain torque requests.

SUMMARY OF THE INVENTION

An engine management system according to the invention for a vehicle includes a vehicle data bus. An engine control module is connected to the vehicle data bus. A transmission control module is connected to the vehicle data bus. A dedicated data bus connects the transmission control module to the engine control module.

In other features of the invention, the vehicle data bus is a serial data bus. The dedicated data bus is also a serial data bus. An electronic throttle control sensor is connected to the engine control module. The engine control module and the transmission control module perform processor validity and integrity checks over the dedicated data bus.

An alternate engine management system according to the invention for a vehicle includes a vehicle data bus. An engine control module is connected to the vehicle data bus and includes a main module and a watchdog module. A transmission control module is connected to the vehicle data bus. A dedicated data bus connects the main module to the watchdog module.

In other features of the invention, the vehicle data bus is a serial data bus. The dedicated data bus is a serial data bus. An electronic throttle control sensor is connected to the engine control module. The main module and the watchdog module perform processor validity and integrity checks over the dedicated data bus.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION OF THE PREFERRED EMBODIMENT

The following description of the preferred embodiment(s) is merely exemplary in nature and is in no way intended to limit the invention, its application, or uses.

Figure 1:
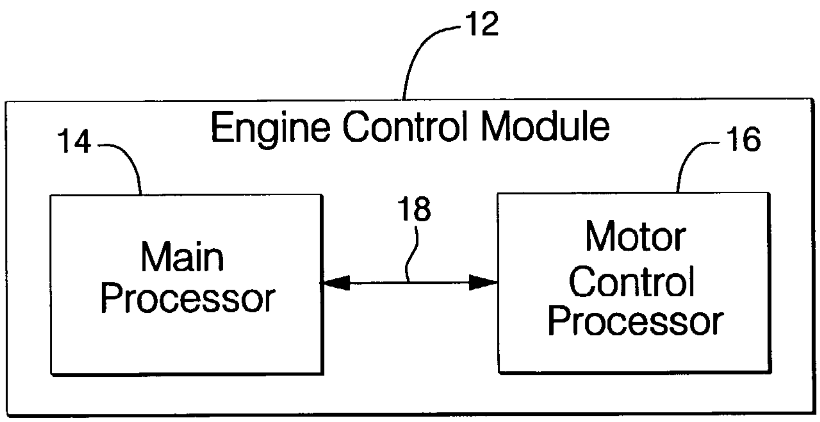
PRIOR ART FIG. 1
FIG. 1 illustrates an engine control module including a main processor, a motor control processor, and a data bus according to the prior art.

Referring now to FIG. 1, a first exemplary engine management system according to the prior art includes an engine control module 12 with a main processor 14 and a motor control processor 16. The main processor 14 is connected to the motor control processor 16 via a data bus 18. The data bus 18 is typically a serial data bus. Both the main processor 14 and the motor control processor 16 perform redundant pedal-throttle and processor integrity checks. The engine management system may optionally include a transmission control module (not shown) that is connected to the data bus 18.

Figure 2:
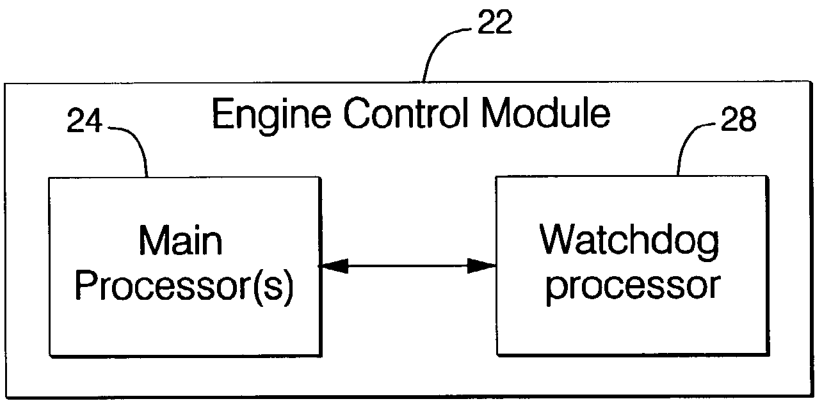
PRIOR ART FIG. 2
FIG. 2 illustrates an engine control module including a main processor, a watchdog processor, and a data bus according to the prior art.

Referring now to FIG. 2, a second exemplary engine management system according to the prior art includes an engine control module 22 with a main processor 24 and a watchdog processor 28. The main processor 24 is connected to the watchdog processor 28 via a data bus 30. The data bus 30 is typically a serial data bus. The main processor 24 performs processor integrity checks and may be implemented using one or more processors. The watchdog processor 28 also performs processor integrity checks.

In future applications, electric throttle control algorithms may not be responsible for powertrain torque control. The present invention provides a powertrain architecture and algorithms that check the integrity of powertrain torque requests. To ensure the integrity of powertrain torque, the engine control module and the transmission control module should cross-check each other for processor validity and integrity.

The cross-checking for processor validity and integrity needs to occur on a dedicated data bus because the primary powertrain data bus is shared with other vehicle control systems. Therefore, the primary powertrain data bus is unable to provide the necessary security functionality and meet time criteria for security functions. For applications that do not include a transmission control module (such vehicles with as manual transmissions), a similar approach may be employed with the processor in the engine control module. The redundant processor is used for cross-check in the processor to confirm processor validity and integrity.

Figure 3:
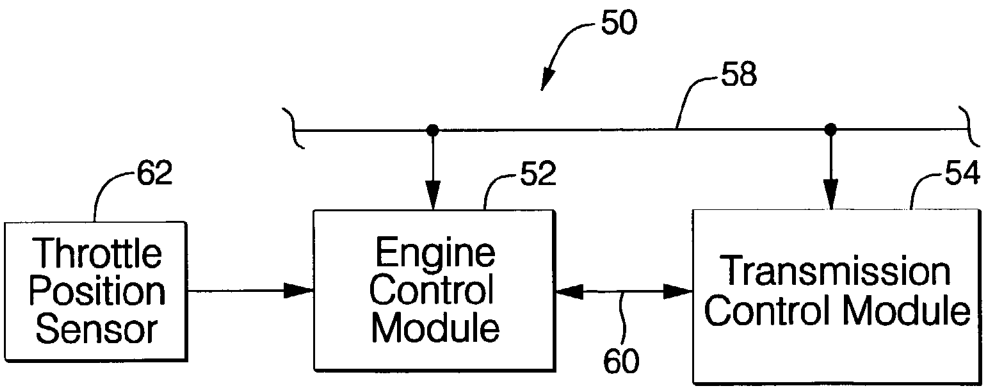
FIG. 3 illustrates a powertrain management control system according to the present invention including an engine control module, a transmission control module, a vehicle serial data bus, and a dedicated serial data bus.

Referring now to FIG. 3, a first powertrain management system 50 according to the present invention is illustrated and includes an engine control module 52 and a transmission control module 54. The engine control module 52 is connected to the transmission control module 54 via a vehicle serial data bus 58. In addition, the engine control module 52 is connected to the transmission control module 54 via a dedicated serial data bus 60. A throttle position sensor is connected to either the engine control module 52, the vehicle serial data bus 58 or another data path accessible by the engine control module.

Figure 4:
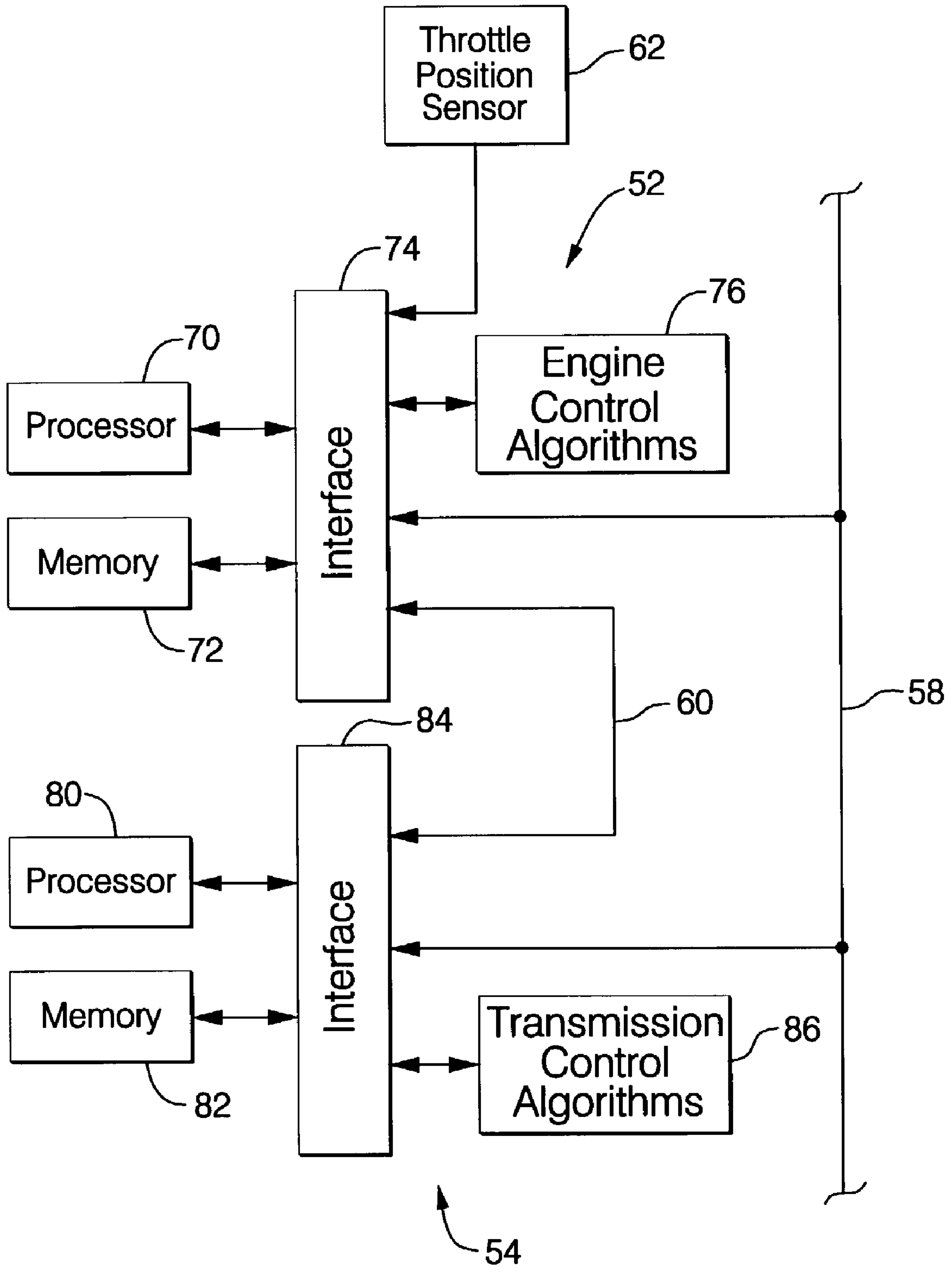
FIG. 4 illustrates the powertrain management system of FIG. 3 in further detail.

Referring now to FIG. 4, the engine control module 52 includes one or more processors 70, memory 72 [such as read only memory (ROM), random access memory (RAM), flash memory or other suitable electronic storage], and an input/output (I/O) interface 74. A throttle position sensor 62 is connected to the I/O interface 74. The processors execute conventional engine control algorithms 76. The processor(s) 70 also perform processor integrity checks over the external dedicated serial data bus 60 and/or the vehicle serial data bus 58.

The transmission control module 54 likewise includes one or more processors 80, memory 82 (such as RAM, ROM, flash memory or other suitable electronic storage), and an (I/O) interface 84. The processor(s) 80 execute conventional transmission control algorithms 86. The processor(s) 80 perform processor integrity checks over the vehicle serial data bus 58 and/or the dedicated serial data bus 60. As can be appreciated by skilled artisans, the dedicated serial data bus 60 is able to provide the necessary security functionality while meeting the time requirements for the communications link.

Processor validity checks include seed and key checks. The transmission control module 54 sends a seed (a value or set of values) to the engine control module 52 via the communications channel. The engine control module 52 uses the seed(s) as an input to a calculation or series of calculations, which produce the key. The key is then sent to the transmission control module 54 again via the communications channel, which verifies that the key is the expected value. The transmission control module 54 takes remedial action if the key does not match the expected value.

Correlation checks may also be performed. Similar calculations are performed in both the transmission control module 54 and engine control module 52. Both of the outcomes of these calculations are compared via the communications channel. If the two processors disagree, then remedial action is taken. The threshold of deciding that disagreement (or a lack of correlation) exists may be nonzero because the transmission control module 54 and the engine control module 52 may use different input data for the test (for example, if each processor uses separate A/D reads of the same sensor) or one processor (usually the transmission control module 54) may use a more simple calculation or may perform the calculation at a slower rate.

Processor presence checks may also be performed. The transmission control module 54 monitors to determine if a message is received from the engine control module 52 at a predetermined frequency. Rolling counters may be used. These are similar to processor presence checks except that the message sent to the transmission control module 54 counts up or down each message. Processor presence checks and rolling counters may not need a message sent from the transmission control module 54 to the engine control module 52. Skilled artisans will appreciate that the respective roles of the engine and transmission control modules 52 and 54 may be reversed in the above description and that other processor and validity checks may be performed without departing from the invention.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

The invention claimed is:

1. An engine management system for a vehicle, comprising;

a vehicle data bus;

an engine control module connected to said vehicle data bus;

a transmission control module connected to said vehicle data bus; and a second dedicated data bus connecting said transmission control module to said engine control module, where said engine control module and said transmission control module perform processor validity and integrity checks over said dedicated data bus and said second dedicated data bus is not connected to said vehicle data bus.

2. The engine management system of claim 1 wherein said vehicle data bus is a serial data bus.

3. The engine management system of claim 1 wherein said dedicated data bus is a serial data bus.

4. The engine management system of claim 1 further comprising an electronic throttle control sensor connected to said engine control module.

5. An engine management system for a vehicle, comprising:

a serial vehicle bus;

an engine control module connected to said serial vehicle data bus;

a transmission control module connected to said serial vehicle data bus; and a second dedicated data bus connecting said transmission control module to said engine control module, wherein said engine control module and said transmission control module perform processor validity and integrity checks over said dedicated data bus and said second dedicated data bus is not connected to said serial vehicle bus.

6. The engine management system of claim 5 wherein said dedicated data bus is a serial data bus.

7. The engine management system of claim 5 further comprising an electronic throttle control sensor connected to said serial engine control module.

8. An engine management system for a vehicle comprising:

a vehicle data bus;

an engine control module connected to said vehicle data bus;

a transmission control module connected to said vehicle data bus;

an electronic throttle controller to control a throttle plate with an electric actuator having a control sensor, said control sensor connected to said engine control module; and a dedicated data bus connecting said transmission control module to said engine control module, wherein said engine control module and said transmission control module perform processor validity and integrity checks over said dedicated data bus and said second dedicated data bus is not connected to said vehicle data bus.

9. The engine management system of claim 8 wherein said dedicated data bus is a serial data bus.

10. The engine management system of claim 8 wherein said vehicle data bus is a serial data bus.

11. An engine management system for a vehicle, comprising:

a serial vehicle data bus;

an engine control module connected to said serial vehicle data bus;

a transmission control module connected to said serial vehicle data bus;

an electronic throttle control sensor connected to said engine control module;

an electronic throttle controller for controlling an electric motor actuating a throttle plate, said electronic throttle controller connected to said serial vehicle data bus; and a dedicated serial data bus connecting said transmission control module to said engine control module, wherein said engine control module and said transmission control module perform processor validity and integrity checks over said dedicated data bus and said dedicated data bus is not connected to said serial vehicle data bus.

* * * * *